United States Patent [19]

Strauss et al.

[11] 4,062,781
[45] Dec. 13, 1977

[54] DISPOSABLE FILTER WITH INTERCHANGEABLE END ELEMENTS

[75] Inventors: Richard Strauss, Lexington; Philip C. Kimball, Andover, both of Mass.

[73] Assignee: Whatman Reeve Angel Limited, Maidstone, England

[21] Appl. No.: 692,993

[22] Filed: June 4, 1976

[51] Int. Cl.² .............................................. C02C 1/14
[52] U.S. Cl. ...................................... 210/446; 55/498; 55/501; 55/511; 210/450; 210/451; 210/453; 210/455; 210/456
[58] Field of Search ................. 55/498, 500, 527, 501, 55/502, 511, 514, 503, 504, 510, 521; 210/443, 446, 451, 434, 445, 450, 453, 455, 456

[56] References Cited

U.S. PATENT DOCUMENTS

| 3,002,870 | 10/1961 | Belgarde et al. | 55/498 |
| 3,767,054 | 10/1973 | Farrow et al. | 210/488 |
| 3,772,857 | 11/1973 | Jackson et al. | 55/503 |
| 3,815,744 | 6/1974 | Vanderpoel | 210/448 |
| 3,868,973 | 3/1975 | Bierman et al. | 210/488 |

*Primary Examiner*—Frank W. Lutter
*Assistant Examiner*—Frank Sever
*Attorney, Agent, or Firm*—Richard P. Crowley

[57] ABSTRACT

A disposable filter unit which comprises a self-gasketing, self-supporting, bonded, glass-fiber filter tube sealed in a housing with two similar plastic molded end units, with one peripheral edge of the tube compressed against the interior face surface of one end unit, and the other peripheral edge against a solid surface disc element within the housing.

11 Claims, 1 Drawing Figure

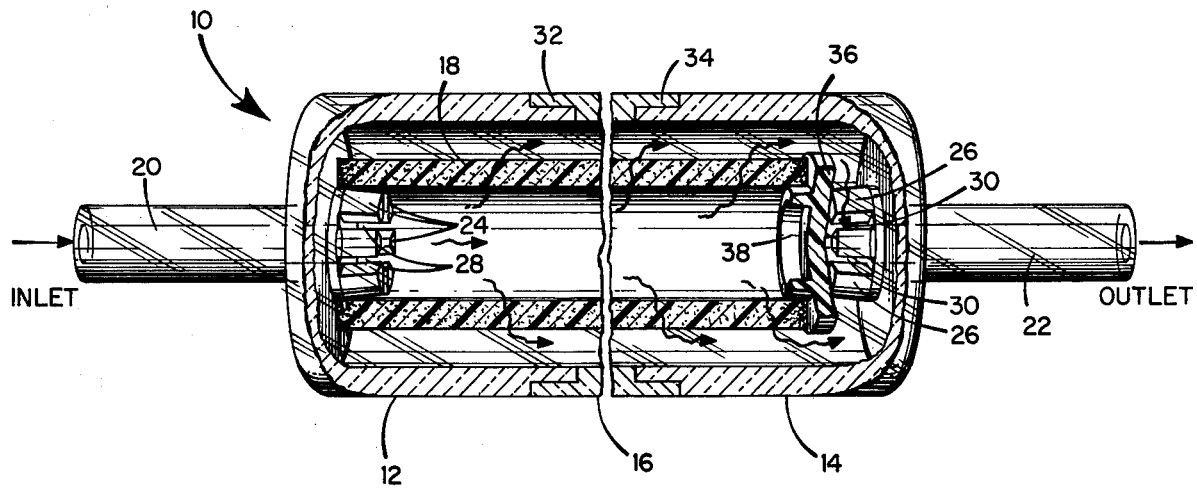

DISPOSABLE FILTER WITH INTERCHANGEABLE END ELEMENTS

BACKGROUND OF THE INVENTION

Filter tubes adapted to filter fluids, such as gases or liquids, typically are mounted, with or without support cores, in one or more filter tube holders within an external housing to form a filter tube unit or assembly. The costs of the materials used in the holders and the manufacture of the filter tube holders and external housing are often quite expensive, so that the filter tube unit or assembly is usually desiged for long-term use, with only the filter tube being the disposable or replaceable element. However, there is a need for a simple, inexpensive, small, easily fabricated filter tube unit which would be disposable. Such a filter tube unit of complete expendability would be required or necessary for some filtering operations, and such units would constitute a great convenience and saving in other filter operations.

SUMMARY OF THE INVENTION

Our invention relates to a wholly disposable, integral, filter tube unit and more particularly concerns a small, inexpensive, easily fabricated, glass-fiber filter tube unit which is disposable after use. In particular, our invention is directed to a self-supporting, self-gasketing, nonwoven, bonded, glass-fiber filter tube sealed within a plastic filter unit composed of only a few component parts.

Our invention comprises a disposable filter tube unit in which there is sealed a self-supporting, nonwoven, bonded, fibrous filter tube; e.g., bonded glass fibers, characterized in that compression of the peripheral ends of the filter tube provides a self-gasketing, fluid-tight seal against a surface.

In one embodiment, the filter tube comprises a plurality of nonwoven, randomly disposed glass fibers, for example, of borosilicate glass, having a diameter of from about 0.001 to about 10 microns; e.g., 0.03 to 8 microns. The fibers form a semirigid, self-supporting structure having interstices between the fibers to define a porosity of the filter tube. The fibers are bonded at the junctions of the fiber crossovers with a binding agent, such as a resin like a hardened resin; e.g., a silicone resin, a phenolformaldehyde resin, or an epoxy resin, or a high-temperature organic binder or an inorganic binder, such as silica. Typical filter tubes of the type useful in our filter are described in U.S. Pat. No. 3,767,054, issued Oct. 23, 1973, herein incorporated by reference.

Our filter unit includes a pair of end elements, each element comprising: an interior face surface; an outer cylindrical flange extending from the interior face and adapted to form, with the combination of the first and second elements, a sealed housing to enclose the filter tube; an inner, short, cylindrical flange extending from the interior face, the outer diameter of the flange about that of or slightly less than the inner diameter of the filter tube, the flange having or defining at least one passageway therein; and a tube coaxial with the filter tube and extending into the inner flange to form a fluid-flow passage between the exterior and the interior of the end element, whereby a fluid may be introduced or removed from the filter unit. The end elements are composed of a hard plastic material, such as nylon, polypropylene, acrylate, polycarbonate or other moldable plastic material. The plastic may be pigmented; i.e., opaque, or be transparent and translucent in nature, so that the filter tube and flow can be observed and the filter unit be disposed of when desired by visual observation of the filter. Filter units composed of plastic material, such as nylon, are useful for filtration of compressed air or noncorrosive gases or liquids; e.g., at pressures of up to 125 psig and at temperatures of up to 230° F at 0 psig. Filter units composed of plastic material, such as polypropylene, are useful in the filtration of most organic solvents, corrosive liquids like acids and alkali and low-pressure gases; e.g., at pressures of up to about 40 psig and at temperatures of up to about 230° F at 0 psig. The end units used in the filter unit are the same in construction; thus, reducing the number of components making up the filter unit and permitting interchangeability of the end units as desired.

The filter unit includes first and second end integrally molded plastic elements, each of the same structure and each element comprising an interior face surface and an outer cylindrical flange extending from the interior face and adapted to form, with the combination of the first and second elements, and optionally with an intervening cylindrical body element, a sealed housing to enclose the filter tube.

The filter unit includes a solid disc element, for example, of plastic, and often of the same or similar plastic as the end units, having inner and outer face surfaces, the diameter of the disc element being about that of or slightly greater than the outer diameter of the filter tube, and having a short cylindrical flange extending from the inner face surface, the said flange having an outer diameter about that of or slightly less than the inner diameter of the filter tube.

In fabrication and assembly of the filter unit, the inner flange of the first end element is snugly disposed within the inner diameter of the filter tube at the one end, and the flange of the disc element snugly disposed within the inner diameter of the filter tube at the other end.

The first and second end elements are aligned coaxially, positioned and then sealed together with or without an intervening cylindrical body element to form a sealed enclosed housing about the filter tube, with the length of the housing adapted to position the inner flange of the second end element against the outer face surface of the solid disc element, and to compress the peripheral edge at the one end of the filter tube into a fluid seal against the interior face surface of the first end element, and the peripheral edge of the filter tube at the other end into a fluid seal against the inner face surface of the disc element.

In the preferred embodiment, a cylindrical plastic body element is inserted and sealed or otherwise secured between the respective end units to form a filter tube unit of the desired length. The edges of the body element and/or the end elements may be flanged or interlocked so that the edges may be sealed together with a suitable adhesive; e.g., a solvent-type curable adhesive, to form a fluid-tight sealed housing about the filter tube. The body element may be as long as required, so that longer housings using the same molded end elements can be made into filter units.

Our invention provides a small filter unit for high efficiency gas and liquid filtration and with the convenience of expendability. The filter unit may be employed in a wide variety of filter applications, such as the removal of dust, particles, oil and water from compressed air to instruments and fluidic controls or to filter high purity gases. The filter unit may be presterilized in an autoclave, and further provides for the filtration of small quantities of liquids with a minimum of holdup volume and no cross-contamination, and, for example, may be used for the filtration of precious metal solutions without leakage. With the glass filter tube described, liquid filtration efficiencies of from about 0.3 microns to about 25 microns and gas filtration efficiencies of from about 90% to 99.9999+% are possible.

Thus, our disposable plastic filter tube unit only comprises in its simplest form four components; i.e., two identical end units, a filter tube and a disc element, and if desired a plastic body element to extend the filter tube length. The components other than the filter tube are formed of hard, moldable, inexpensive, plastic material. The filter unit is easily fabricated and the filter tube sealed therein.

BRIEF DESCRIPTION OF THE DRAWING

The drawing is a schematic cross-sectional illustration of our filter tube.

DESCRIPTION OF THE EMBODIMENTS

Our filter 10 includes similar plastic molded end units 12 and 14 with a plastic cylindrical body 16 between the end units, the end units being flanged 32 at the end to fit mating flanges 34 on each end of the body 16, with the body 16 and the end units secured together, for example, by an adhesive, such as a cross-linkable adhesive material. The end unit 12 has tubular inlet 20 and end unit 14, a tubular outlet 22 as illustrated where the flow is to be from inside to outside; although the filter tube can be employed, where desired, for outside-to-inside flow. Disposed within the plastic sealed housing is a nonwoven, bonded, self-supporting, borosilicate, glass-fiber tube 18 of the type described, supra. The end units each have an interior face surface from which protrudes inner, central, cylindrical, short flanges having a plurality of barbs or teeth 24 and 26 which define spaces 28 and 30 therebetween. The short inner flanges have an outer diameter about that or just slightly less than the diameter of the filter tube 18. The barbs 24 of the end unit 12 fits snugly within the inner diameter at one end of the filter tube 18, with the peripheral edges of the tube 18 at this end disposed against the smooth plastic interior face surface of the end unit 12, with the flange barbs 24 extending within and providing internal support to the inner periphery of the tube 18. The glass fibers of the tube 18 at the edge are axially compressed at the end to form a self-gasketing and fluid-tight peripheral seal which obviates the need for a separate gasket if desired, and forms a seal as strong as the tube 18 itself.

A solid, plastic, circular, disc element 36 having an inner cylindrical short flange 38 is disposed at the other end of the filter tube 18, with the flange 38 of similar outside diameter as the flange barbs 24 and 26. The flange 38 is disposed within the interior of the tube 18 and serves the same function as flange 24. The other peripheral edge of the filter tube is disposed against the smooth interior face surface of the disc 36, the disc being of the same or slightly greater diameter than that of the external diameter of tube 18, so as to permit the tube edge to form a complete, compressed, fluid-tight, self-gasketing seal of the fibers to the surface of the disc. The flange barbs 30 of end unit 14 is disposed against the other exterior surface of the disc 36. The filter unit is designed to be of such length as to cause both peripheral edges of the tube to be compressed sufficiently, as illustrated, on fabrication of the disposable filter unit to form self-gaskets at each end of the tube. The openings 30 between the barbs 26 of the flange define flow passages which permit the fluid filtered to pass to the outlet 22.

As illustrated, the barbs on the flanges define at the one end flow passages, while at the other end of the similar end unit, serve to center in a simple manner the filter tube 18 on the internal coaxial diameter. Of course, as desired, the flanges, rather than defining flow passages by variations in the end edges of the flanges, may comprise defined flow passages, such as a plurality of circular passageways, in the sides of the flange elements. The body element 16 can be of a length as desired or required so that larger housings can readily be assembled to fit varying filter tube lengths for differing filtering applications and uses. The disposable filter unit is illustrated in its simplest form without a drain outlet or means, so that, when or if the filter unit becomes saturated with a liquid, such as water, it must be replaced; although, if desired, a drain means can be placed in the filter.

The filter unit illustrated is easily molded or formed from a hard plastic material, and comprises only five easily assembled components — the filter tube 18, body element 16 (which is optional), end units 12 and 14 of similar construction and disc element 36. The diameter and length of the filter unit may vary, and, for example, may range from about 1 inch to 3 inches in size to accommodate filter tubes ranging from about ½ to 2 inches in diameter. The units may be of any length; e.g., range from about 1 ½ to 6 inches or more in length. The plastic material for the unit is typically similar for all components. In one embodiment, the external diameter of the filter unit is 0.9 to 1.0 inches, the filter tube of ½-inch external diameter, the filter unit 1 ½ inches in length, with the inlet and outlet of 0.125 inches internal diameter, and with the end units and body having a wall thickness of about 0.125 inches.

In use, the inlet and outlet are secured to a pressure-tight connection, such as standard compression fittings for high pressure or a slip-on plastic tubing for low pressure. After use, the entire sealed filter unit may be disposed of and a new filter unit inserted. If desired, the filter unit may be made for disassembly and the insertion of a new filter tube.

Our filter unit comprises, as shown and described, a simple, inexpensive, easily fabricated and used disposable filter unit.

What we claim is:

1. A disposable filter unit which comprises:
   a. a self-supporting, nonwoven, bonded, glass-fiber filter tube in which compression of the peripheral ends of the filter tube provides a fluid-tight seal against a surface;
   b. two substantially identical interchangeable molded plastic end elements, each element comprising
      i. an interior face surface,
      ii. an outer cylindrical flange extending from the interior face and adapted to form with the combination of said end elements a sealed housing to enclose the filter tube,
      iii. an inner, short, cylindrical flange extending from the interior face, the outer diameter of the flange about that of or slightly less than the inner diameter of the filter tube, the flange having or defining at least one passageway therein, and
      iv. a tube coaxial with the filter tube and extending into the inner flange to form a fluid-flow passage between the exterior and the interior of the end element such that a fluid may be introduced or removed from the filter unit;
c. a solid disc element having an inner and an outer face surface, the diameter of the disc element about that of or slightly greater than the outer diameter of the filter tube, and having a short cylindrical flange extending from the inner face surface, the said flange having an outer diameter about that of or slightly less than the inner diameter of the filter tube;
d. the inner flange of one of said end elements functioning as a means to center the filter tube snugly disposed within the inner diameter of the filter tube at the one end, and the flange of the disc element snugly disposed within the inner diameter of the filter tube at the other end; and
d. said end elements aligned, positioned and secured to form a sealed enclosed housing about the filter tube, with the length of the housing adapted to position the inner flange of the other of said end elements against the outer face surface of the solid disc element, and to compress the peripheral edge at the one end of the filter tube into a fluid seal against the interior face surface of said one of said end elements and the peripheral edge of the filter tube at the other end into a fluid seal against the inner face surface of the disc element, said inner flange of said other of said elements functioning as a flow-passage means,
such as to provide a simple, inexpensive integrally disposed filter unit.

2. The filter unit of claim 1 wherein the filter tube comprises a plurality of nonwoven, borosilicate glass fibers having a diameter of from about 0.03 to about 8 microns, the fibers bonded at the junctions of the fiber crossovers with a binding agent.

3. The filter unit of claim 2 wherein the binding agent comprises a hardened thermoset resin.

4. The filter unit of claim 1 wherein the molded end elements comprise polycarbonate, acrylate nylon or polypropylene.

5. The filter unit of claim 1 wherein the end elements comprise a hard translucent polymer.

6. The filter unit of claim 1 wherein the inner flanges of the end elements comprising a plurality of barb-like elements extending inwardly from the face surface of the end elements, and define flow passages therebetween.

7. The filter unit of claim 1 which includes a plastic, cylindrical body element, the body element of predetermined length and positioned between and sealed to the end elements to form with the end elements a sealed housing of the desired length.

8. The filter unit of claim 7 wherein the peripheral edges of the outer flanges of the first and second end elements and each peripheral edge of the body element are flanged to permit an overlapping adhesive seal to be formed.

9. The filter unit of claim 1 wherein the disc element comprises a solid plastic disc element of the same or similar plastic as the end elements.

10. A disposable filter unit which comprises:
a. a self-supporting, nonwoven, bonded, glass-fiber filter tube comprising a plurality of nonwoven, borosilicate glass fibers having a diameter of from about 0.03 to about 8 microns, the fibers bonded at the junctions of the fiber crossovers with a binding agent in which compression of the peripheral ends of the filter tube provides a fluid-tight seal against a surface;
b. two substantially identical interchangeable molded plastic end elements, each element comprising
 i. an interior face surface,
 ii. an outer cylindrical flange having peripheral edges which are flanged to permit an overlapping adhesive seal to be formed, the flange extending from the interior face and adapted to form with the combination of the said end elements a sealed housing to enclose the filter tube,
 iii. an inner, short, cylindrical flange extending from the interior face and comprising a plurality of barb-like elements extending inwardly from the face surface of the end elements, and defining passages therebetween, the outer diameter of the flange about that of or slightly less than the inner diameter of the filter tube, the flange having or defining at least one passageway therein, and
 iv. a tube coaxial with the filter tube and extending into the inner flange to form a fluid-flow passage between the exterior and the interior of the end element such that a fluid may be introduced or removed from the filter unit;
c. a plastic, cylindrical body element, the body element of predetermined length and positioned between and sealed to the first and second end elements to form with the end elements a sealed housing of the desired length;
d. a solid plastic disc element having an inner and an outer face surface, the diameter of the disc element about that of or slightly greater than the outer diameter of the filter tube, and having a short cylindrical flange extending from the inner face surface, the said flange having an outer diameter about that of or slightly less than the inner diameter of the filter tube;
e. the inner flange of one of said end elements functioning as a means to center the filter tube snugly disposed within the inner diameter of the filter tube at the one end, and the flange of the disc element snugly disposed within the inner diameter of the filter tube at the other end; and
f. said end elements aligned, positioned and sealed to form a sealed enclosed housing about the filter tube, with the length of the housing adapted to position the inner flange of the other of said end elements against the outer face surface of the solid disc elements, and to compress the peripheral edge at the one end of the filter tube into a fluid seal against the interior face surface of said one of said end elements and the peripheral edge of the filter tube at the other end into a fluid seal against the inner face surface of the disc element, said inner flange of said other of said elements functioning as a flow-passage means,
such as to provide a simple, inexpensive, integrally disposed filter unit.

11. The filter unit of claim 9 wherein the molded end elements, body element and disc element all are of the same plastic and comprise translucent polycarbonate, acrylate, nylon or polypropylene.

* * * * *